(12) United States Patent
French (10) Patent No.: US 7,559,416 B2
(45) Date of Patent: *Jul. 14, 2009

(54) FREE COASTER BICYCLE HUB

(75) Inventor: George French, Sheffield (GB)

(73) Assignee: Bear Corporation, Cerritos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/215,878

(22) Filed: Jun. 30, 2008

(65) Prior Publication Data

US 2008/0264752 A1      Oct. 30, 2008

Related U.S. Application Data

(63) Continuation of application No. 11/337,019, filed on Jan. 20, 2006, now Pat. No. 7,445,105.

(51) Int. Cl.
*F16D 41/24* (2006.01)
*B60B 27/04* (2006.01)

(52) U.S. Cl. .................... 192/64; 192/37; 192/41 R; 301/110.5

(58) Field of Classification Search ............ 192/37, 192/54.2, 54.5, 64
See application file for complete search history.

(56) References Cited

U.S. PATENT DOCUMENTS

| 524,652 | A | 8/1894 | Risinger |
|---|---|---|---|
| 619,721 | A | 2/1899 | Conwell |
| 691,147 | A | 1/1902 | Keating |
| 1,551,423 | A | 8/1925 | Netter |
| 2,125,763 | A | 8/1938 | Anderson |
| 3,107,764 | A | 10/1963 | Fulton |
| 3,368,834 | A | 2/1968 | Stratienko |
| 4,574,649 | A | 3/1986 | Seol |
| 6,588,559 | B2 | 7/2003 | Blair |
| 7,445,105 | B2 * | 11/2008 | French ................ 192/64 |
| 2007/0240960 | A1 | 10/2007 | French |

FOREIGN PATENT DOCUMENTS

GB      2372545      8/2002

* cited by examiner

*Primary Examiner*—Rodney H Bonck
(74) *Attorney, Agent, or Firm*—Cislo & Thomas, LLP

(57) ABSTRACT

A free coaster bicycle wheel driving apparatus having a clutch that employs radially acting components. A drive sleeve has an inner cylindrical wall surface mounted coaxially about a wheel mounting shaft and an outer cylindrical wall surface that is eccentric relative to the drive sleeve inner wall surface. The outer surface of the drive sleeve cooperates with a power transmission sleeve that has an inner cylindrical wall surface that is eccentric relative to its cylindrical outer wall surface. The power transmission sleeve is interposed between the drive sleeve and a wheel hub. When the eccentric lobe on the drive sleeve is in opposition to the eccentric lobe on the surrounding power transmission sleeve, the sprocket is disengaged from the wheel hub. Forward rotation of the sprocket jams the lobe of the drive sleeve against the power transmission sleeve, forcing its cam lobe outwardly into frictional engagement with the wheel hub.

12 Claims, 9 Drawing Sheets

FREE COASTER BICYCLE HUB

CROSS-REFERENCE TO RELATED APPLICATION

This patent application is a continuation of and claims the benefit of U.S. patent application Ser. No. 11/337,019, entitled "Free Coaster Bicycle Hub" filed Jan. 20, 2006, which application is incorporated in its entirety by this reference.

TECHNICAL FIELD

The present invention relates to a bicycle hub drive system with a clutch that allows a bicycle rider to easily engage and disengage the hub drive system of the bicycle.

BACKGROUND

In a conventional bicycle drive system a rider powers the bicycle by applying force through the rider's feet to the bicycle pedals which are mounted on a crank arm to a large sprocket which drives a chain loop in rotation in a forward direction. The chain is engaged with a smaller sprocket that is coupled to the hub of the rear bicycle wheel.

There is a recognized desire among many riders of trick bicycles to have a rear wheel which is capable of being entirely disengaged from the drive train. With a conventional free wheel ratchet mechanism the rider is forced to backpedal constantly to allow the rear bicycle wheel to rotate in reverse. Since the rider's weight is predominantly carried by the pedals, this constant backpedaling can upset the rider's balance. It also makes some tricks much harder to perform than would otherwise be the case.

There are conventional systems that allow a rider to disengage the drive sprocket from the hub. Such systems operate by means of a clutch hub which only engages the drive when the rider pedals in a forward direction. The hub begins disengagement from the drive sprocket when the forward force applied to the bicycle pedals ceases. Deliberate backpedaling by the rider at this point will cause the clutch to become fully disengaged. Once fully disengaged the hub is free to rotate in either direction without any effect on the positions of the bicycle pedals.

Existing bicycle clutch designs of this type typically employ a jamming cone which is moved axially to jam in a conical seat. However, the axial movement required is typically created using a drive thread. Drive threads are difficult to manufacture and are also expensive. Furthermore, the axial movement of the clutch parts creates large axial loads which are undesirable. Furthermore, the action is also generally poor.

Another problem with conventional clutches of this type is that the hub runs on a bearing fitted to the outside of the driver. Such a construction results in large bearing sizes and an undesirable "nested" bearing arrangement. Other types of bearing arrangements are impractical due to the large amount of space required by the mechanism.

While some bicycle clutches have been devised that utilize a radial movement of rollers, the intricacies of the design and the restricted space have resulted in very high contact stresses. These excessive stresses lead to premature failure and poor reliability and function. Furthermore, clutches of this type are quite expensive to produce.

SUMMARY

The improved design of the present invention differs significantly both in structure and principle of operation from conventional bicycle clutch arrangements. Unlike prior systems, the present invention utilizes a radial movement, not an axial movement, to engage the clutch. The clutch design of the present invention uses a very simple pair of eccentric surfaces to create a radial expansion on one side to grip a surrounding driving surface on the inside of the hub shell. The clutch and hub components are greatly simplified and are therefore easier and cheaper to manufacture.

In one broad aspect the present invention may be considered to be a bicycle wheel hub assembly comprising a wheel hub, an annular power transmission sleeve, a sprocket, a drive sleeve, and a drag mechanism. The wheel hub of the invention is rigidly coupled to the wheel while the drive sleeve is rigidly coupled to the sprocket.

The wheel hub is formed with a wheel hub shell disposed coaxially about a wheel mounting shaft. The wheel hub shell is journaled for rotation about the wheel mounting shaft. A cylindrical, annular hub cavity is defined between the wheel hub shell and the wheel mounting shaft. The annular power transmission sleeve is disposed within the hub cavity and defines a cylindrical power transmission sleeve outer surface and a cylindrical power transmission sleeve inner surface that is eccentric relative to the power transmission sleeve outer surface.

The sprocket has sprocket teeth projecting radially relative to a sprocket axis. The drive sleeve projects from the sprocket axially toward the hub. A central, cylindrical mounting shaft opening is defined through the drive sleeve to receive the wheel mounting shaft coaxially therewithin. The drive sleeve defines a cylindrical drive sleeve outer surface that is eccentric relative to the mounting shaft opening. The drive sleeve is disposed within the power transmission sleeve. The drag mechanism is mounted on the wheel mounting shaft to retard rotation of the power transmission sleeve relative thereto.

The transmission sleeve inner surface defines an inner transmission sleeve axis that is radially equidistant from all locations on the circumference of the transmission sleeve inner surface. The drive sleeve outer surface defines an outer drive sleeve axis that is radially equidistant from all locations on the circumference of the drive sleeve outer surface.

Both the power transmission sleeve and the drive sleeve have wall thicknesses that vary between a location of maximum wall thickness and a diametrically opposite location of minimum wall thickness due to the eccentric surfaces thereof. The location of maximum wall thickness in the drive sleeve forms a "lobe", as does the location of maximum thickness of the power transmission sleeve. The location of minimum wall thickness forms a hollow or "pocket" on the inner wall surface of the power transmission sleeve.

The outer, eccentric surface forming the lobe on the drive sleeve acts in cooperation with the surrounding annular inner eccentric surface of the power transmission sleeve which is interposed between the drive sleeve and the wheel hub. When the lobe of the drive sleeve is in opposition to the lobe of the power transmission sleeve, that is, when the lobe of the drive sleeve resides in the pocket of the power transmission sleeve, a gap or clearance exists between the outer surface of the power transmission sleeve and the surrounding cylindrical inner wall surface of the hub cavity. While the drive sleeve and the power transmission sleeve reside in this relative position of angular orientation with respect to each other, the sprocket does not rotate with the wheel, but instead "coasts" in the manner of the old coaster brakes that were in widespread use about a half-century ago.

On the other hand, when the sprocket is driven in a forward direction, in turn rotating the drive sleeve in forward rotation, the lobes of the eccentric pieces approach alignment with each other. The thicknesses of the lobes of the eccentric drive sleeve and the eccentric power transmission sleeve are cumulative. The lobe of the drive sleeve forces the surrounding power transmission sleeve outwardly against the inner surface of the surrounding wheel hub shell, thereby "jamming" it against the inner surface of the wheel hub shell.

In order for the eccentric portion, that is, the lobe of the drive sleeve extending axially inwardly toward the hub from the sprocket, to move toward radial alignment with the lobe of the power transmission sleeve, a certain amount of drag must be exerted on the power transmission sleeve. For this reason at least one, and preferably a pair of axially acting springs are provided to exert the necessary bias on the power transmission sleeve to resist rotation relative to the wheel mounting shaft. The springs are preferably annular disc spring washers mounted to the wheel mounting shaft and acting in an axial direction against the power transmission sleeve. The annular disc spring washers provide a small force of resistance to rotation against the power transmission sleeve in opposition to the much larger driving forces applied by rotation of the sprocket.

Preferably also, the free coaster bicycle hub of the invention is provided with at least one shim washer disposed on the wheel mounting shaft. The use of a shim washer or plurality of shim washers allows the rider to increase or decrease the degree of compressive axial force on the spring washers as desired.

Also, it is highly desirable for the system to include a backpedal safety mechanism to limit counterrotation of the power transmission sleeve relative to the sprocket drive sleeve so as to keep the eccentric lobes of the drive sleeve and the power transmission sleeve in diametric opposition when the sprocket is counterrotated. This backpedal safety mechanism is provided by a stud or peg on the outer surface of the drive sleeve that extends axially inwardly toward the wheel hub. This stud or peg moves in counterrotation with the drive sleeve and meets an axially outwardly projecting lug or tang that projects into its path of movement from the power transmission sleeve.

In preferred embodiments of the invention there are preferably alternative mounting locations for the stud or peg so that it is possible for the drive sleeve to "catch" the power transmission sleeve and move it in counterrotation therewith at different angular offsets between the lobes on the drive sleeve and on the power transmission sleeve. The rider is thereby able to determine the suitable degree of clearance that is needed at which the peg of the drive sleeve contacts the power transmission sleeve during the movements of counterrotational disengagement from the hub. Furthermore, these alternative mounting locations thereby control the amount of forward pedaling rotation that is needed for the rider to reengage the drive system of the hub.

The invention might also be considered to be a bicycle wheel clutch comprising: a wheel hub having an outer shell mounted about a wheel mounting shaft and defining a cylindrical annular hub cavity therebetween, an annular power transmission sleeve, a sprocket defining a drive axis and having a drive sleeve rigidly coupled thereto, and a drag mechanism. The wheel mounting shaft has outboard ends releaseably securable to bicycle frame dropouts. The cylindrical, annular hub cavity has a cylindrical inner wall surface that is spaced in radial separation from and coaxial relative to the wheel mounting shaft. The hub shell is journaled to rotate freely relative to the wheel mounting shaft.

The annular power transmission sleeve is disposed within the hub cavity and has a cylindrical power transmission sleeve outer wall surface and a cylindrical power transmission sleeve inner wall surface of smaller diameter than, and defined eccentrically relative to, the power transmission sleeve outer wall surface.

The drive sleeve is rigidly coupled to the sprocket and is disposed within the power transmission sleeve. The drive sleeve has a central, cylindrical drive shaft opening defined through its structure that is disposed coaxially about the wheel mounting shaft. The drive sleeve has a cylindrical outer drive sleeve surface that is eccentric relative to the central cylindrical drive shaft opening. The drag mechanism retards rotation of the annular power transmission sleeve relative to the drive sleeve.

The free coaster bicycle wheel hub assembly works using two nested cams. The inner "drive" sleeve cam runs on a fixed axis that is the same as the axis of the hub itself. The outer surface of the drive sleeve is eccentric and therefore has an axis that is offset from the axis of the hub and is always a set distance from the axis of the hub. This set distance establishes the extent of the eccentricity of the drive sleeve outer surface.

Similarly, the outer cam, or power transmission sleeve, runs directly on the outer surface of the drive cam. The axis of the inner surface of the power transmission sleeve, and therefore the axis it turns on, is the same as the axis of the outer surface of the drive cam or drive sleeve. The axis of the outer surface of the drive cam or drive sleeve is the constraint about which the power transmission sleeve turns. The common axis of the drive sleeve outer surface and power transmission sleeve inner surface orbits about the hub axis of rotation.

Since the power transmission sleeve turns about the axis of the outer surface of the drive sleeve, the axis of the outer surface of the power transmission sleeve is always a fixed distance from the axis of the outer surface of the drive sleeve. This fixed distance establishes the extent of eccentricity of the power transmission sleeve.

The axis of the outer surface of the power transmission sleeve, and the main hub axis, which is also the main drive sleeve axis and the axis of the inner surface of the drive sleeve, do move relative to one another.

Because the inner and outer surface of the drive sleeve are not coaxial to each other, the drive sleeve forms a drive sleeve cam lobe where its wall thickness is greatest. Similarly, since the inner and outer surfaces of the power transmission sleeve are not coaxial to each other, the power transmission sleeve forms a power transmission sleeve cam lobe where its wall thickness is greatest.

When the power transmission sleeve cam lobe is in diametric opposition to the drive sleeve cam lobe, considered with respect to the drive shaft and hub axis of rotation, a clearance exists between the power transmission sleeve outer wall surface and the inner wall surface of the hub cavity. Under this condition the power transmission sleeve is disengaged from a driving relationship relative to the hub. When the power transmission sleeve cam lobe departs from diametric opposition relative to the drive sleeve cam lobe, the power transmission sleeve outer wall surface is forced by the drive sleeve into frictional engagement with the inner wall surface of the hub cavity.

In still another aspect the invention may be considered to be a free coaster bicycle wheel driving apparatus comprising: a driving member, an annular drive sleeve, an annular power transmission sleeve mounted about the drive sleeve, a bicycle wheel hub, and a drag mechanism. The driving member includes a sprocket for engagement with a bicycle chain and defines a central drive axis. The annular drive sleeve is rigidly joined to the sprocket and projects axially inwardly from the sprocket. The annular drive sleeve has a cylindrical inner wall surface coaxial with the drive axis and a larger diameter cylindrical outer wall drive surface that is eccentric relative to the cylindrical inner wall surface thereof. The annular power transmission sleeve has a cylindrical inner wall surface and a larger diameter cylindrical outer wall surface that is eccentric relative to the cylindrical inner wall surface thereof. The inner wall surface of the power transmission sleeve surrounds and resides in contact with the outer wall surface of the drive sleeve.

The bicycle wheel hub has a central cylindrical wheel mounting shaft that projects outwardly through the sprocket and resides in coaxial alignment with the central drive axis. The wheel mounting shaft is radially encircled by the inner wall surface of the drive sleeve. The hub has a cylindrical, annular outer shell freely rotatable about the wheel mounting shaft. The shell defines a cylindrical annular cavity therewithin with a cylindrical inner hub wall surface that is coaxial relative to the central drive axis.

The power transmission sleeve is disposed within the cavity in the hub shell and the drive sleeve is disposed within the power transmission sleeve. The power transmission sleeve is shiftable radially relative to the central drive axis so that the outer wall surface of the power transmission sleeve engages the inner hub wall surface and the outer wall surface of the drive sleeve engages the inner wall surface of the power transmission sleeve. The hub is thereby engaged with the sprocket when the cam lobes of the eccentric surfaces depart from an angular offset of one hundred eighty degrees and advance toward radial alignment with each other.

On the other hand, the power transmission sleeve rotates freely within the cavity in the hub shell when the eccentric surfaces approach diametrical opposition relative to each other. The hub is disengaged and rotates freely about the axle when the eccentric surfaces approach diametrical opposition relative to each other. The drag mechanism restrains rotation of the power transmission sleeve relative to the wheel mounting shaft.

The invention may be described with greater clarity and particularity by reference to the accompanying drawings.

DETAILED DESCRIPTION OF THE INVENTION

Figure 1:
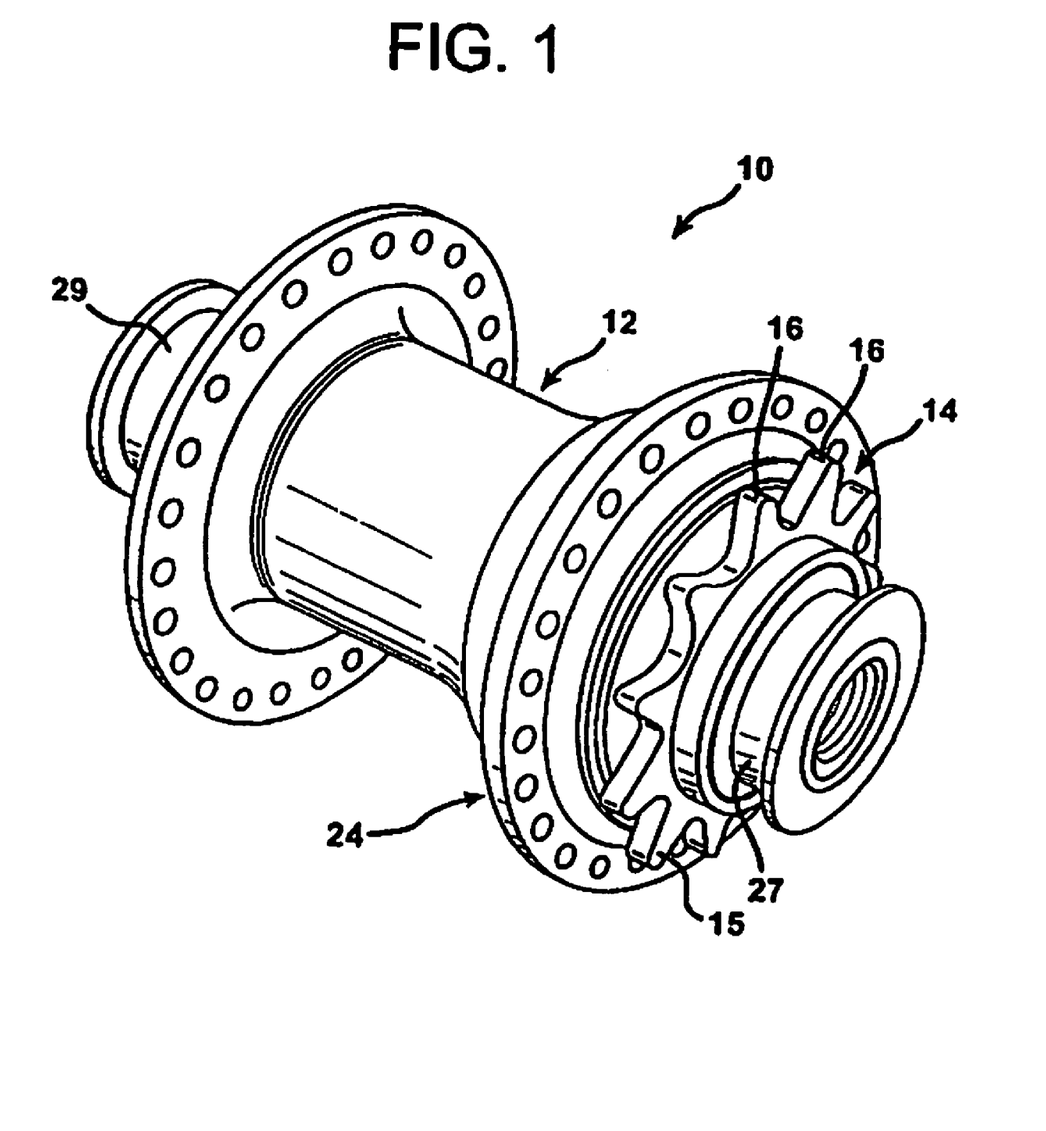
FIG. 1 is a perspective view of the preferred embodiments of a fully assembled free coaster bicycle wheel driving apparatus constructed according to the invention.
Figure 8:
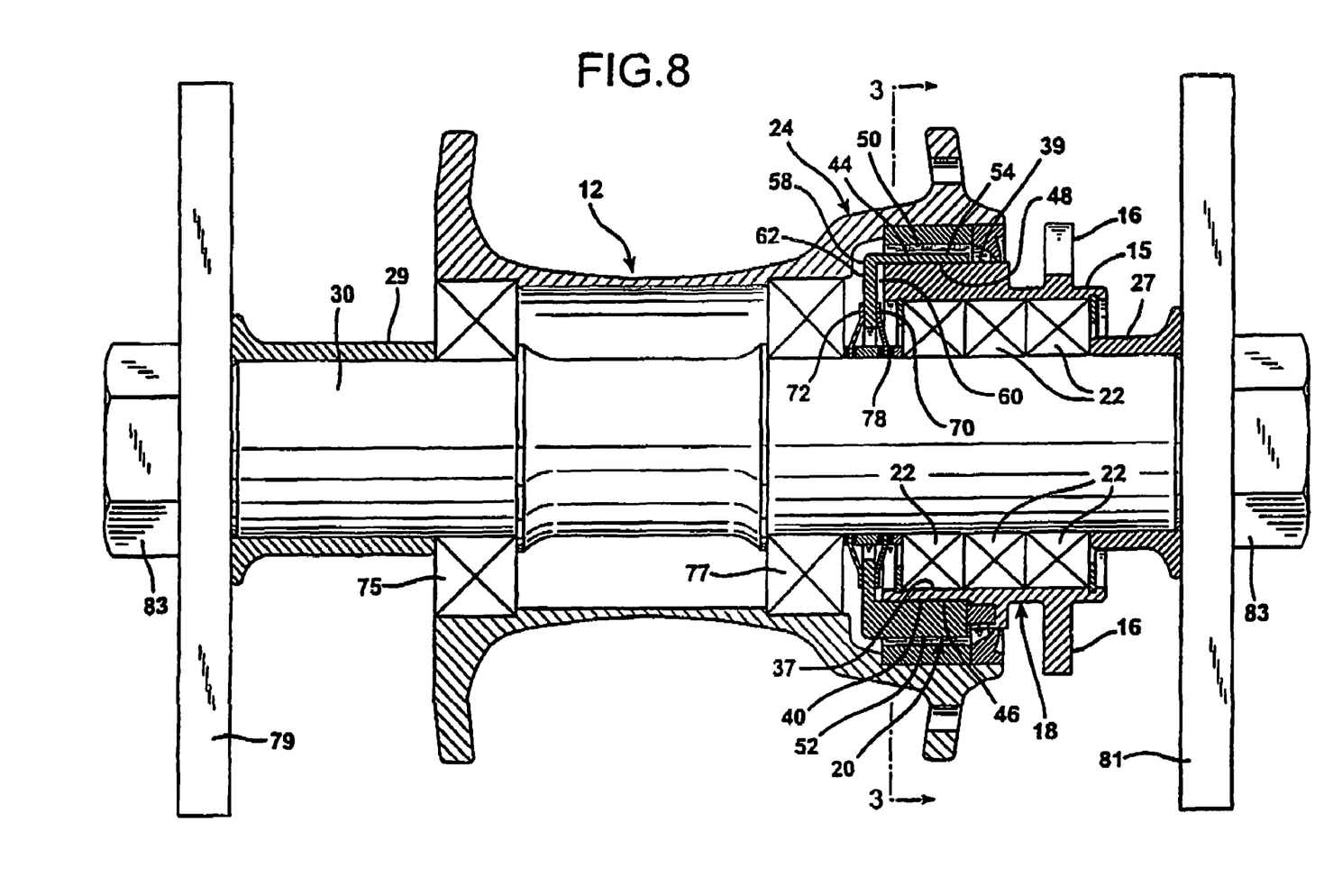
FIG. 8 is a transverse schematic sectional view illustrating the entire axle assembly, including the free coaster bicycle driving apparatus of the invention.

FIG. 1 illustrates a free coaster bicycle wheel driving apparatus indicated generally at 10. The driving apparatus is a bicycle wheel hub assembly that employs a bicycle wheel clutch. The driving apparatus is comprised of a wheel hub 12 and a sprocket assembly 14, as well as certain additional component members illustrated in FIG. 2. Specifically, the sprocket assembly 14 includes a sprocket 15 having conventional teeth 16 that engage a bicycle chain, as well as a drive sleeve 18. A central, cylindrical wheel mounting shaft opening 17 is defined through the sprocket assembly 14 to receive the wheel mounting shaft 30 coaxially therewithin. The drive sleeve 18 is rigidly joined to the sprocket 15 and extends axially therefrom in an inboard direction toward the wheel hub 12. The driving apparatus 10 is further provided with a power transmission sleeve 20, three longitudinally aligned, sealed cartridge bearings 22, and a drag mechanism illustrated in FIG. 6. Outboard axle spacer collars 27 and 29 are provided to properly position the hub assembly components on the wheel mounting shaft 30. The axle spacing collars 27 and 29 are embraced between the bicycle frame dropouts 79 and 81 and prevent shifting of the hub assembly components on the mounting shaft 30, as illustrated in FIG. 8. Conventional axle fasteners 83 secure the bicycle wheel driving apparatus 10 in position between the frame dropouts 81 and 79.

The bicycle wheel hub 12 is a conventional structure having a cylindrical, annular, generally barrel-shaped shell 24, the opposing ends of which terminate in radially outwardly projecting annular flanges 26 having apertures 28 arranged about their peripheries to receive the radial inboard ends of bicycle spokes. The hub shell 24 is rotatably mounted about a central, cylindrical wheel mounting shaft 30, the outboard ends of which are internally threaded as illustrated and which may be releaseably secured to conventional bicycle frame dropouts 79 and 81, as illustrated in FIG. 8.

A cylindrical annular hub cavity 32 is defined within the hub shell 24 and about the wheel mounting shaft 30. The hub cavity 32 has a cylindrical inner wall surface 34 that resides in radial separation from the wheel mounting shaft 30. The hub shell 24 is journaled to rotate freely about the wheel mounting shaft 30 in a conventional manner.

The sprocket assembly 14 is mounted coaxially about the wheel mounting shaft 30 and either or both of these members may be considered to define a central drive axis of hub and wheel rotation 36. The cylindrical annular cavity 32 within the hub shell 24 is coaxial relative to the central drive axis 36. The annular drive sleeve 18 is rigidly joined to the sprocket 15, so that the sprocket assembly 14 turns in rotation as a unit. The drive sleeve 18 projects axially inwardly from the sprocket 15 and toward the hub 12. The sprocket 15 is not illustrated in FIGS. 4 and 5 so as to allow illustration of the operative components of the clutch mechanism of the invention in those drawing figures.

The annular drive sleeve 18 has a cylindrical inner wall surface 37 that is coaxial with the drive axis 36 and a larger diameter cylindrical outer wall drive sleeve surface 40 that is eccentric relative to the cylindrical inner wall surface 37. The central, cylindrical drive shaft opening 31 that is defined through the drive sleeve 18 is disposed coaxially about the wheel mounting shaft or hub axle 30.

The drive sleeve 18 is a composite structure that houses conventional, sealed cartridge bearing units 22 that are coaxial with the hub axle 30. The cartridge bearings 22 are seated within the drive sleeve 18, which serves as a jacket for them. The inner, central, cylindrical surface 37 of the drive sleeve 18 tightly grips the outer surfaces of the cartridge bearings 22. The outer surface 40 of the drive sleeve 18 is eccentric relative to its inner surface 37 and is eccentric relative to the bearings 22. The bearings 22 are held in the drive sleeve 18, and are coaxial with the hub axle 30.

The drive sleeve 18 defines an annular wall between its inner surface 37 and its outer surface 40 that varies in thickness between a location of maximum wall thickness, indicated in the drawings at 44, and a location of minimum wall thickness indicated at 46. The location of maximum wall thickness 44 may be considered to be a cam lobe. The location of minimum wall thickness 46 is located diametrically opposite the cam lobe formed at the location of maximum wall thickness 44. The variation in wall thickness is due to the eccentricity of the surfaces 38 and 40 relative to each other. The diametric opposition of the cam lobe 44 from the location of minimum thickness 46 is an accurate description considered both with respect to the axis of alignment of the cylindrical inner drive sleeve surface 37, which is the axis 36, and with respect to the axis of the cylindrical outer drive sleeve surface 40.

The power transmission sleeve 20 is formed as a cup-shaped member having a cylindrical inner wall surface 48 and a larger diameter cylindrical outer wall surface 50. The cylindrical inner wall surface 48 is eccentric relative to the cylindrical outer wall surface 50 of the power transmission sleeve 20. The drive sleeve 18 is disposed within and surrounded by the power transmission sleeve 20 and the power transmission sleeve 20 is disposed within the hub cavity 32 and surrounded by the hub shell 24.

The power transmission sleeve 20 has a wall thickness that varies between a location of maximum wall thickness 52, which may be considered to be a cam lobe and a location of minimum wall thickness indicated at 54 located diametrically opposite the lobe 52, considered with respect to the drive axis 36. The location of minimum wall thickness 54 on the inner surface 48 in the power transmission sleeve 20 may be considered to form a "pocket".

Figure 6:
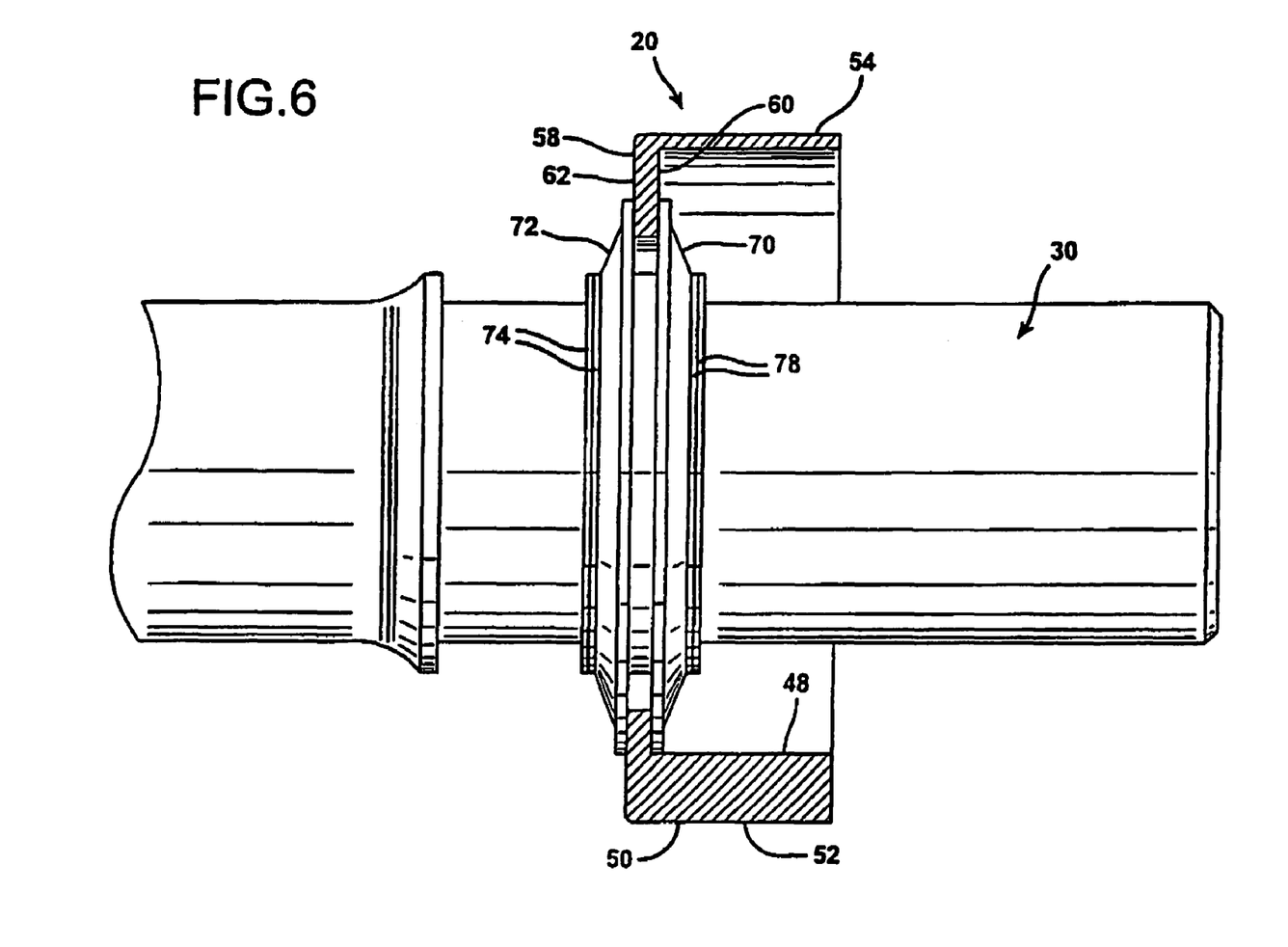
FIG. 6 is a longitudinal sectional detail illustrating the drag mechanism of the driving apparatus of FIGS. 1-5, shown in isolation from the sprocket assembly.

The power transmission sleeve 20 has an annular flange 58 at its inboard end that is directed radially inwardly from its outer surface 50. The annular flange 58 has an outboard annular surface 60 and an inboard annular surface 62. The surfaces 60 and 62 oppose each other and face in opposite axial directions, as indicated in FIG. 6. The width in a radial direction of the annular surface 60 of the flange 58 facing the drive sleeve 18 varies from a minimum width at the cam lobe 52 to a maximum width at the pocket 54 due to the eccentricity of the inner power transmission sleeve surface 48 and the outer power transmission sleeve surface 50 relative to each other.

Figure 2:
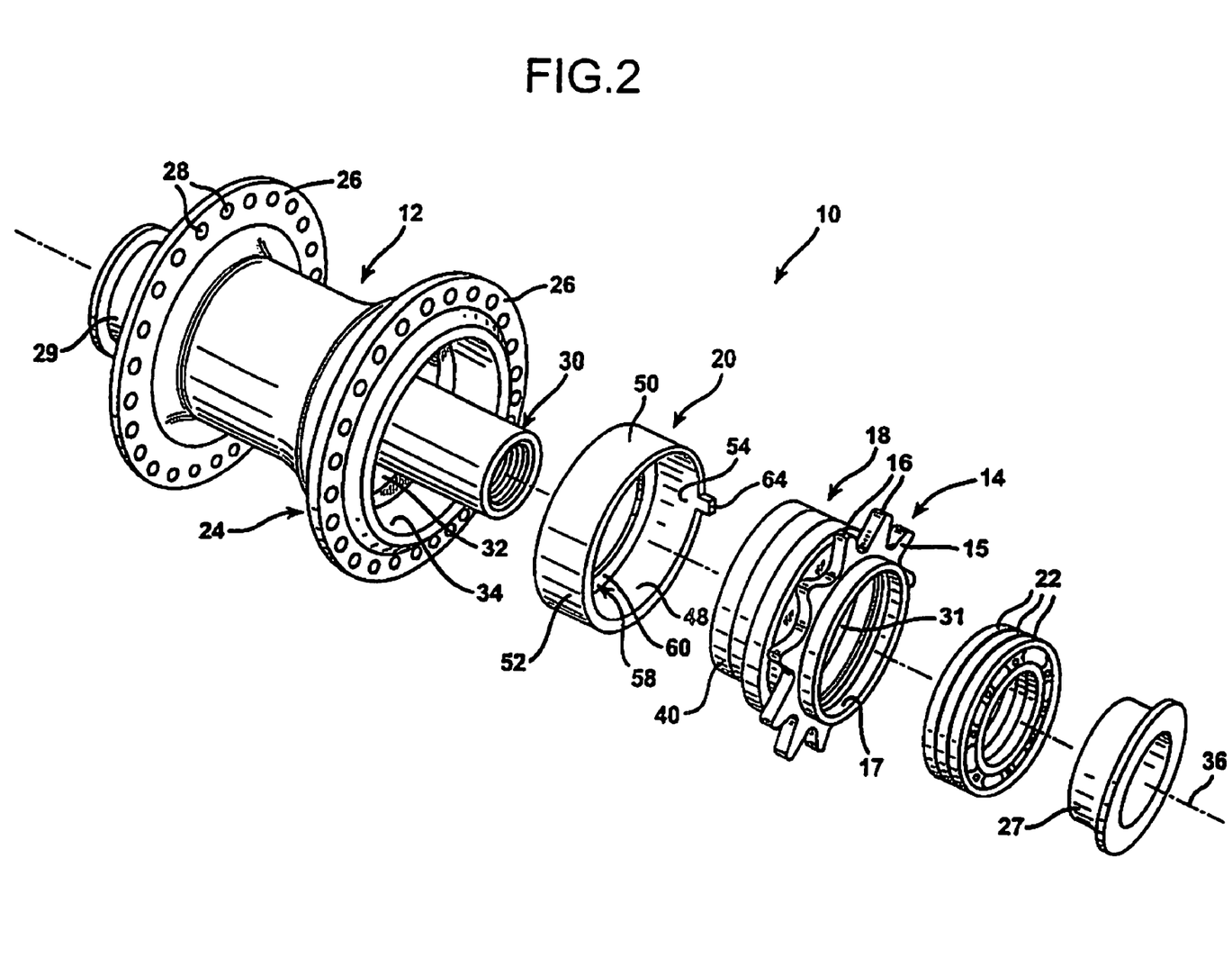
FIG. 2 is an exploded perspective view of the driving apparatus of FIG. 1.

The power transmission sleeve 20 also has an axially projecting lug or tang 64 formed at its location of minimum wall surface 54. The tang 64 is directed toward the sprocket 15, as illustrated in FIG. 2.

The power transmission sleeve 20 is disposed within the cavity 32 in the hub shell 24 and the drive sleeve 18 is disposed within the power transmission sleeve 20. The power transmission sleeve inner wall surface 48 thereby surrounds and resides in contact with the outer wall surface 46 of the drive sleeve 18.

The central, cylindrical wheel mounting shaft 30 projects outwardly through the sprocket assembly 14 and resides in coaxial alignment with the central drive axis 36. The wheel mounting shaft 30 is radially encircled by the inner wall surface 37 of the drive sleeve 18.

The drag mechanism is formed by shim spacers 78 and a pair of cylindrical annular spring washers 70 and 72 that are mounted upon opposite sides of the radially directed power transmission flange 58 of the power transmission sleeve 20. The spring washers 70 and 72 are limited in axial movement in an inboard direction by hub shell bearing 77 and cartridge bearings 22, shown in FIG. 8, that are installed on the wheel mounting shaft 30 and clamped between the dropouts of the frame. The periphery of the spring washer 72 faces the inboard surface 62 of the power transmission flange 58 and resides in contact therewith. The other annular spring washer 70 faces in an opposite, inboard direction. Its periphery faces and resides in contact with the surface 60 of the power transmission sleeve flange 58.

The spring washers 70 and 72 are held in a compressed condition against the opposing faces of the flange 58 by the total assembly of the hub upon the wheel mounting shaft 30, which is then installed in the bicycle frame dropouts 79 and 81, as illustrated in FIG. 8. The spring washers 70 and 72 thereby exert a compressive force from opposite axial directions against the power transmission sleeve flange 58 so as to exert a light drag on the power transmission sleeve 20.

The annular spring washers 70 and 72 are biased to exert an axial force against the power transmission sleeve 20 from opposite axial directions. The disc springs 70 and 72 bear against the power transmission sleeve 20 in a direction parallel to the wheel mounting shaft 30. The shim washers 78 may be selectively positioned by the rider upon the wheel mounting shaft 30 to vary the magnitude of force exerted by the disc spring washers 70 and 72 against the annular flange 58. To reduce this force the shim washers 78 may be repositioned in an inboard direction to an axial location between the spring washers 70 and 72. That is, the magnitude of the compressive force may be increased by rearranging one or more of the annular shim washers 78 from a position between the spring 70 and the sealed cartridge bearings 22.

The springs 70 and 72 also stabilize the axial location of the lobe 52 of the power transmission sleeve 20 to prevent it from wandering in an axial direction. The spring washers 70 and 72 and the spacer or spacers 78 are clamped to the wheel mounting shaft 30 by the bearings and spacers and are ultimately held in place by the end bolts 83 through the bicycle frame dropouts.

Figure 3A:
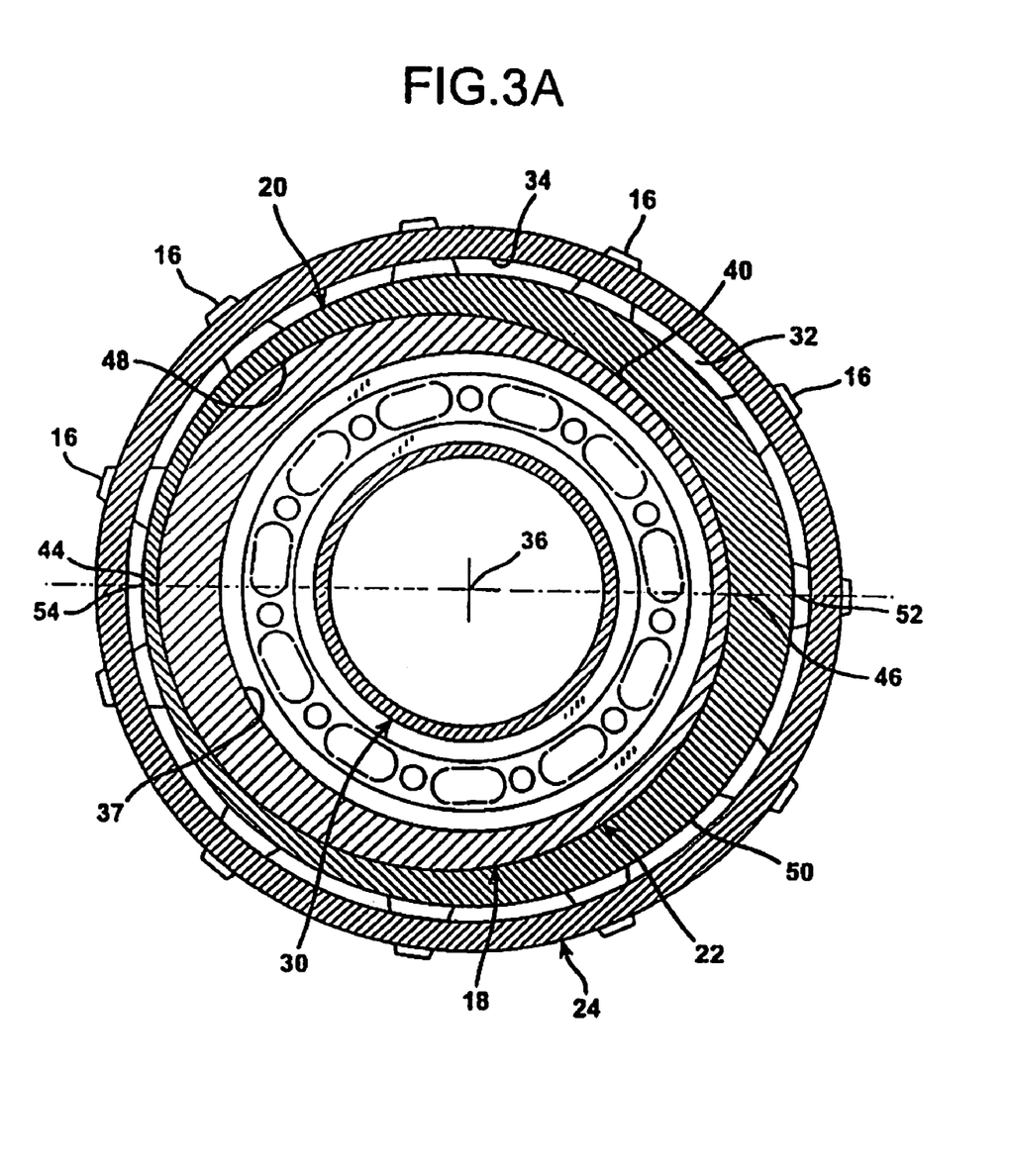
FIG. 3A is a cross-sectional detail taken along the lines 3-3 in FIG. 8 illustrating the relative alignment of the component parts of the wheel driving apparatus in a free coasting condition.
Figure 3B:
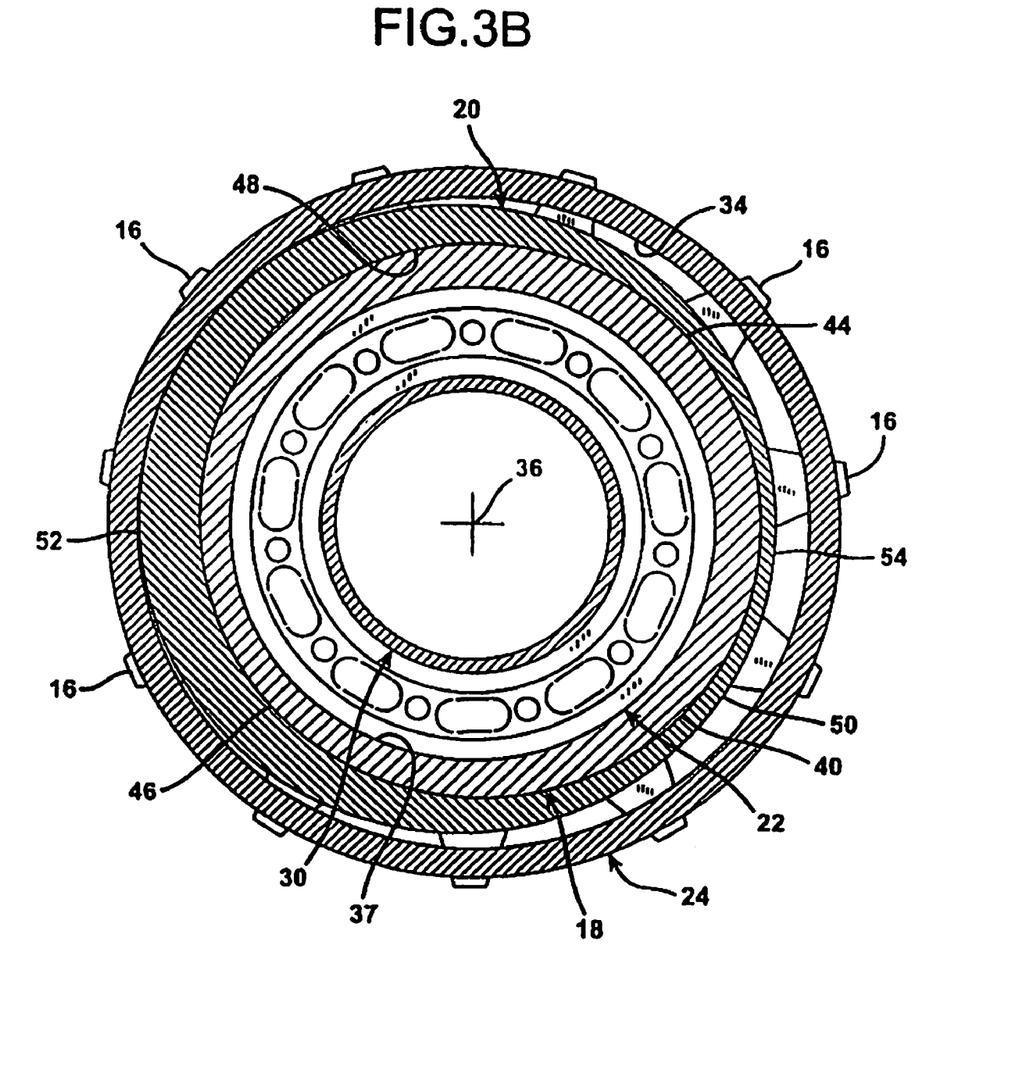
FIG. 3B is a cross-sectional detail illustrating the relative alignment of the component parts of the wheel driving apparatus in a condition in which the sprocket is engaged in a driving relationship with the hub.
Figure 4:
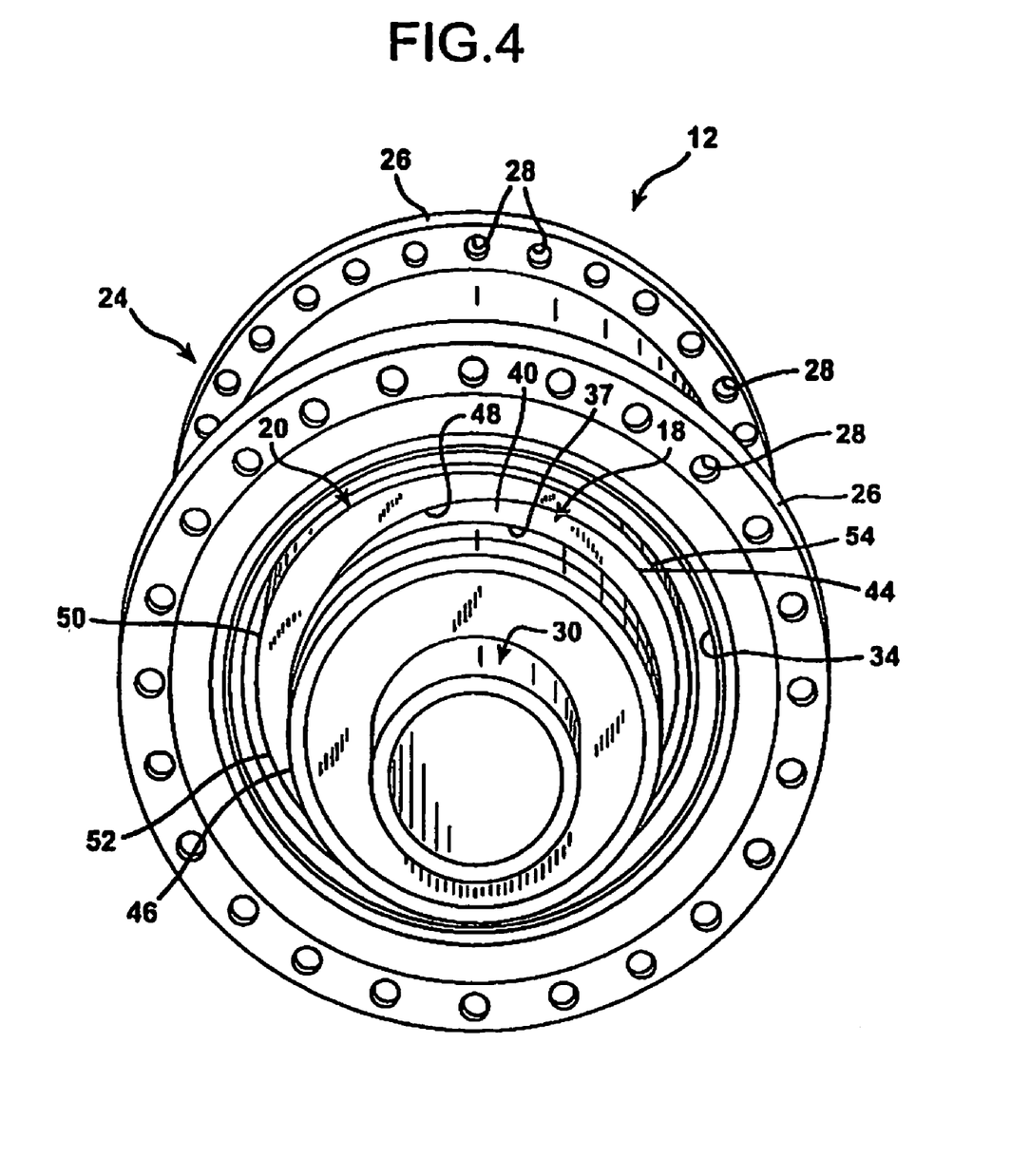
FIG. 4 is a perspective view of the component members of the driving system in the condition illustrated in FIG. 3A.

As illustrated in FIGS. 3 and 4 in the absence of power applied by the rider through the bicycle pedals to the sprocket 15, the power transmission sleeve 20 is shiftable radially relative to the central drive axis 36. The drive sleeve cam lobe 44 and the power transmission sleeve cam lobe 62 can assume locations in diametrical opposition to each other. That is, the cam lobe 44 of the drive sleeve 18 can reside in the pocket 54 of the power transmission sleeve 20 and is diametrically opposite to the cam lobe 52 formed at the location of maximum width of wall thickness of the power transmission sleeve 20. In this condition the diametrical opposition of the cam lobes 44 and 52 essentially centers the power transmission sleeve 20 within the shell 24 so that a clearance gap in the cavity 32 exists between the outer surface 50 of the power transmission sleeve 20 and the inner hub shell wall surface 34 of the hub 24. That is, when the cam lobe 44 is radially aligned with the pocket 54 of the power transmission sleeve 20, a clearance exists between the power transmission sleeve outer wall surface 50 and the inner wall surface 34 of the hub cavity 32. In this condition the sprocket 15 is disengaged from the hub 12, and the bicycle travels in a "coasting" condition. During this condition the backpedal safety mechanism peg 80 carries the power transmission sleeve 20 with it to prevent the transmission sleeve 20 from engaging the hub 12 when the pedals are counterrotated.

Figure 5:
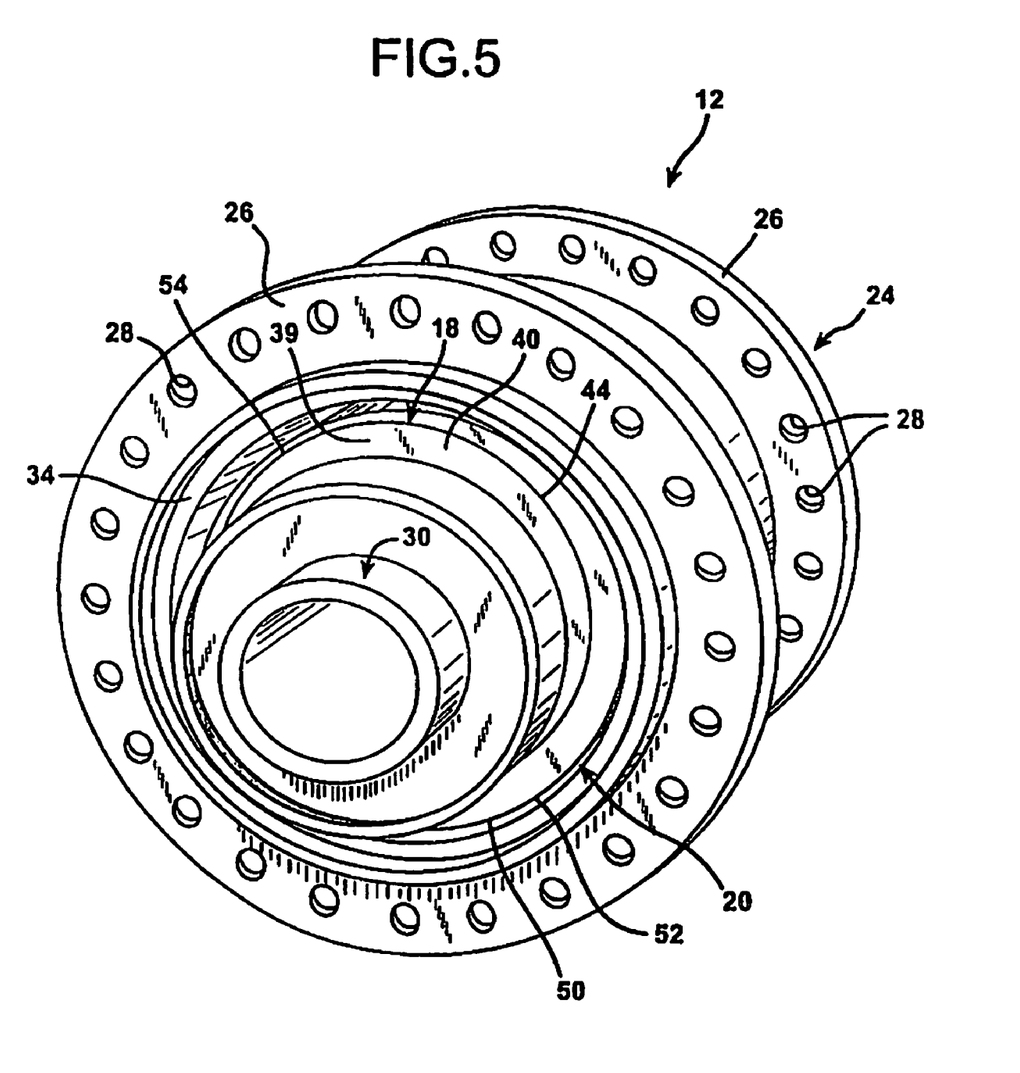
FIG. 5 is a perspective view of the component members of the driving system in the condition illustrated in FIG. 3B.

On the other hand, when the rider wishes to power the bicycle, the rider applies power strokes to the bicycle pedals, which accelerate the rotation of the sprocket 15 and also the drive sleeve 18 relative to the wheel hub 12. Since the spring washers 70 and 72 exert a light retarding force on the rotation of the power transmission sleeve 20, the lobe 44 of the drive sleeve 18 is rotated out of the pocket 54 and out of alignment in diametric opposition to the lobe 52 of the power transmission sleeve 20, as indicated in FIG. 3A. This causes the eccentric outer wall surface 40 of the drive sleeve 18 to push against the inner wall surface 48 of the power transmission sleeve 20 and shift the power transmission sleeve 20 radially relative to the drive axis 36, as illustrated in FIG. 3A. The power transmission sleeve outer wall surface 50 is thereby forced by the drive sleeve 18 into frictional engagement with the inner wall surface 34 of the hub cavity 32. That is, the power transmission sleeve 20 is shifted radially relative to the central drive axis 36 so that the power transmission cam lobe 52 on the outer wall surface 50 of the power transmission sleeve 20 engages the inner hub wall surface 34 while the drive sleeve cam lobe 44 on the outer wall surface 40 of the drive sleeve 18 engages the inner wall surface 48 of the power transmission sleeve 20. With the drive sleeve 18 engaged with the power transmission sleeve 20 and the power transmission sleeve 20 engaged with the hub shell 24, the hub 12 is thereby engaged with the sprocket 15, thereby rotating the rear bicycle wheel. This occurs when the cam lobes 44 and 52 depart from diametric opposition relative to each other. FIGS. 3A and 5 illustrate the drive sleeve 18 in the engaged position, driving the hub 12.

It is highly desirable to provide some system for preventing overrunning. That is, on the whole it would be undesirable for reverse pedaling to cause the mechanism to engage since such motion would cause the mechanism to lock in the engaged mode, which could be hazardous. Furthermore, it is highly desirable to provide some means for adjusting the size of the "dead spot", that is the range of motion, required to engage the drive according to the individual rider's preference. In addition, there has heretofore been no other free coaster hub available that can be installed to work on both the right and left-hand side of the bike and that has the option of driving the wheel forward and in reverse.

It is true that some riders may wish to utilize the ability of the hub to drive the wheel both forward and backward. However, it is usually desirable to provide some system for preventing this type of overrunning. That is, for most riders it would be undesirable for reverse pedaling to cause the mechanism to lock in the engaged mode, which would be hazardous in most instances.

Figure 7:
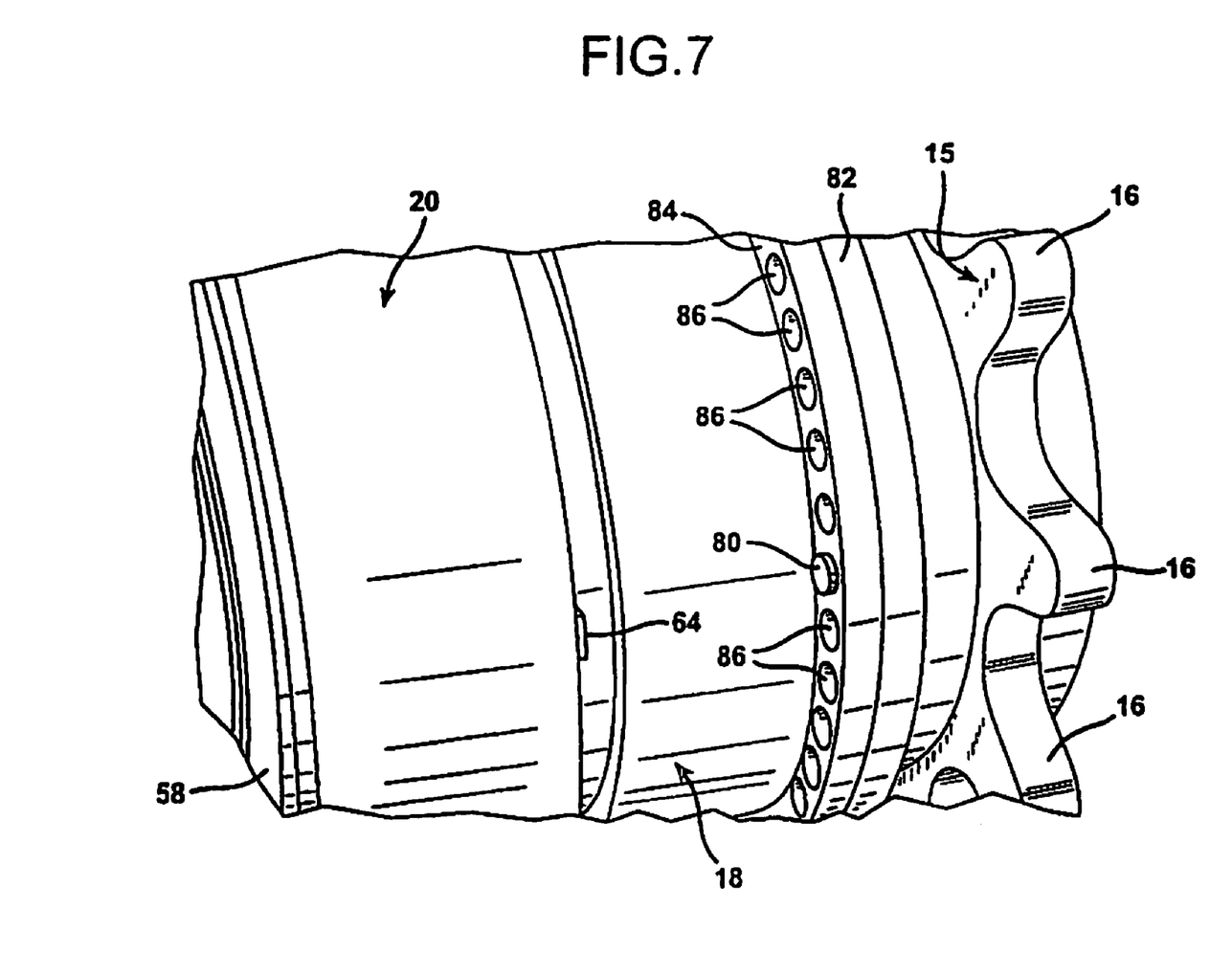
FIG. 7 is an exploded perspective detail illustrating the backpedal safety mechanism of the driving apparatus of FIGS. 1-6.

A suitable backpedal safety adjustment is achieved with the provision of a backpedal safety stud or peg 80. Preferably, the drive sleeve 18 is constructed with an annular, peg mounting ring or ledge 82 that is disposed about the drive sleeve outer wall surface 40. As illustrated in FIG. 7, the peg mounting ring 82 has an annular surface 84 facing in an inboard direction and including a plurality of peg mounting sockets 86 defined therein. The peg 80 can be selectively and alternatively mounted in any one of the peg mounting sockets 86. As illustrated in the exploded view of FIG. 7, the peg 80 is thereby directed toward the power transmission sleeve 20.

In fact, when the unit is fully assembled as illustrated in FIG. 1, the peg or stud 80 travels in a stud path of rotation about the wheel mounting shaft 30 and the backpedal catch lug or tang 64 projects longitudinally in an outboard direction into the stud path of rotation. As a result, rotation of the drive sleeve 18 in one direction of rotation, namely the clockwise direction with reference to drawing FIGS. 3, 3A, 4, and 5, carries the peg or stud 80 away from the backpedal catch tang 64. This allows the spring washers 70 and 72 of the drag mechanism 22 to operate to engage the drive sleeve 18 with the power transmission sleeve 20 and with the hub 12 for rotation together when the cam lobe 52 of the power transmission sleeve inner surface 48 departs from one hundred eighty degree opposition relative to the cam lobe 44 of the radial drive sleeve 18, as illustrated in FIGS. 3A and 5.

On the other hand, counterrotation of the drive sleeve 18 in the counterclockwise direction, as viewed in FIGS. 4 and 5, brings the stud or peg 80 into abutment with the side of the backpedal catch tang 64 as the cylindrical, eccentric drive sleeve outer surface 40 is rotated within the cylindrical, eccentric power transmission sleeve inner surface 48. The catch tang 64 begins to move in rotation about the axis 36 as soon as the rider disengages the wheel hub 12 by removing downward pressure on the pedals. When the sprocket 15 is counter-rotated, the peg 80 shifts the backpedal catch tang 64 to prevent the accidental possibility of engaging the wheel in a backward direction. That is, the drive sleeve 18 is dislodged from engagement with the power transmission sleeve 20 as the degree of offset alignment of the outer eccentric surface 50 of the power transmission sleeve 20 within the hub shell 24 is reduced, as illustrated in FIGS. 3 and 4.

In the preferred embodiment of the invention illustrated the peg 80 is mountable alternatively in any one of the peg mounting sockets 86 so as to extend toward the power transmission sleeve 20 and parallel to the wheel mounting shaft 30. The peg sockets 86 are located at angular intervals of separation from each other about the annular, outer surface 84 of the drive sleeve 18. The peg 80 is selectively and alternatively engageable in each of the peg sockets 86. The backpedal catch tang 64 extends toward the peg mounting ring 82, parallel to the wheel mounting shaft 30. The peg 80 is thereby adjustable in position relative to the location of maximum thickness, that is the lobe 44, on the drive sleeve 18.

Another advantage of providing a plurality, or even a multiplicity of peg sockets 86 about the periphery of the drive sleeve 18 is that it is a very straightforward matter to switch from a left-handed to right-handed drive simply by adjusting the angular relative positions of the drive sleeve 18 and power transmission sleeve 20. That is, with the bicycle wheel removed from between the frame dropouts, the drive sleeve 18 can be withdrawn from the power transmission sleeve 20, rotated slightly relative thereto, and moved back into a fully engaged position so that the peg 80 can strike the tang 64 on either side.

Undoubtedly, numerous variations and modifications of the invention will become readily apparent to those familiar with bicycle clutch and wheel hub assemblies. Accordingly, the scope of the invention should not be construed as limited to this specific embodiment depicted and described, but rather is defined in the claims appended hereto.

What is claimed is:

1. A bicycle wheel hub assembly comprising:
 a. a wheel hub formed with a wheel hub shell disposed coaxially about a wheel mounting shaft, whereby said wheel hub shell is journaled for rotation about said wheel mounting shaft and a cylindrical annular hub cavity is defined therebetween,
  b. an integrally formed power transmission sleeve disposed within said hub cavity and defining a power transmission sleeve outer surface and a cylindrical power transmission sleeve inner surface that is eccentric relative to said power transmission sleeve outer surface,
  c. a sprocket having sprocket teeth projecting radially relative to a sprocket axis, with a central cylindrical wheel mounting shaft opening defined through said sprocket to receive said wheel mounting shaft coaxially therewithin,
  d. a drive sleeve projecting from said sprocket axially toward said hub and defining a cylindrical drive sleeve outer surface that is eccentric relative to said drive shaft opening, and said drive sleeve is disposed within said power transmission sleeve, and
  e. a drag mechanism mounted on said wheel mounting shaft to retard rotation of said power transmission sleeve relative to said drive sleeve.

2. A bicycle wheel hub assembly according to claim 1 wherein said drag mechanism is comprised of at least one annular spring washer mounted on said wheel mounting shaft and compressed axially against said power transmission sleeve.

3. A bicycle wheel hub assembly according to claim 2 further comprising at least one shim washer disposed on said wheel mounting shaft to increase compressive axial force on said spring washer.

4. A bicycle wheel hub assembly according to claim 1 wherein said power transmission sleeve is a cup-shaped member with an annular flange directed radially inwardly from said outer surface thereof, and having opposing surfaces facing in opposite axial directions, and said drag mechanism is comprised of a pair of opposing annular spring washers compressed against said opposing surfaces of said flange.

5. A bicycle wheel clutch comprising:
  a. a wheel hub having an outer shell mounted about a central cylindrical wheel mounting shaft having outboard ends that are releaseably securable to bicycle frame dropouts and a cylindrical annular hub cavity is defined within said hub shell and said hub cavity has a cylindrical inner wall surface that is spaced in radial separation from and coaxial relative to said wheel mounting shaft, and said hub shell is journaled to rotate freely relative to said wheel mounting shaft,
  b. an integrally formed power transmission sleeve disposed within said hub cavity and having a cylindrical power transmission sleeve outer wall surface and a cylindrical power transmission sleeve inner wall surface of smaller diameter than, and defined eccentrically relative to, said power transmission sleeve outer wall surface, whereby said power transmission sleeve defines a power transmission sleeve cam lobe,
  c. a sprocket defining a drive axis and having a drive sleeve rigidly coupled thereto, and said drive sleeve is disposed within said power transmission sleeve and has a central, cylindrical drive shaft opening defined therethrough that is disposed coaxially about said wheel mounting shaft and said drive sleeve has a cylindrical outer drive surface that is eccentric relative to said central cylindrical drive shaft opening, whereby said drive sleeve defines a drive sleeve cam lobe, and
  d. a drag mechanism for retarding rotation of said annular power transmission sleeve relative to said drive sleeve, whereby when said outer drive sleeve cam lobe is rotated away from diametric opposition relative to said power transmission sleeve cam lobe, said power transmission sleeve cam lobe is forced by said drive sleeve into frictional engagement with said inner wall surface of said hub cavity, and when said power transmission sleeve cam lobe is moved toward diametric opposition relative to said drive sleeve cam lobe, a clearance exists between said power transmission sleeve outer wall surface and said inner wall surface of said hub cavity.

6. A bicycle wheel clutch according to claim 5 wherein said drag mechanism is comprised of at least one annular disc spring mounted upon said wheel mounting shaft so as to bear against said power transmission sleeve in a direction parallel to said wheel mounting shaft.

7. A bicycle wheel clutch according to claim 6 wherein said power transmission sleeve includes an annular flange directed radially inwardly toward said wheel mounting shaft, and said disc spring bears against said annular flange in a direction parallel to said wheel mounting shaft.

8. A bicycle wheel clutch according to claim 7 further comprising at least one annular shim washer mounted upon said wheel mounting shaft and selectively positionable thereon to vary the magnitude of force exerted by said disc spring against said annular flange.

9. A bicycle wheel clutch according to claim 5 wherein said power transmission sleeve is formed with an annular flange directed radially inwardly toward said wheel mounting shaft, and said drag mechanism is comprised of a pair of annular disc springs mounted upon said wheel mounting shaft on opposing sides of said annular flange so as to bear against said annular flange in opposite axial directions from each other.

10. A bicycle wheel clutch according to claim 9 further comprising at least one annular shim located on said wheel mounting shaft so as to enhance drag exerted by said annular disc springs upon said annular flange.

11. A free coaster bicycle wheel driving apparatus comprising:
  a. a driving member including a sprocket for engagement with a bicycle chain and defining a central drive axis,
  b. an annular drive sleeve rigidly joined to said sprocket and projecting axially inwardly from said sprocket, wherein said annular drive sleeve has a cylindrical inner wall surface coaxial with said drive axis and a larger diameter cylindrical outer wall drive surface that is eccentric relative to said cylindrical inner wall surface thereof, thereby defining a drive sleeve cam lobe,
  c. an integrally formed power transmission sleeve mounted about said drive sleeve and having an inner wall surface and a larger diameter outer wall surface that is eccentric relative to said inner wall surface thereof, thereby defining a power transmission sleeve cam lobe, whereby said inner wall surface of said power transmission sleeve surrounds and resides in contact with said outer wall surface of said drive sleeve,
  d. a bicycle wheel hub having a central, cylindrical wheel mounting shaft that projects outwardly through said sprocket and resides in coaxial alignment with said central drive axis and is radially encircled by said inner wall surface of said drive sleeve, and said hub has a cylindrical, annular outer shell freely rotatable about said wheel mounting shaft, and said shell defines a cylindrical, annular cavity therewithin with a cylindrical inner hub wall surface that is coaxial relative to said central drive axis, and said power transmission sleeve is disposed within said cavity in said hub shell and said drive sleeve is disposed within said power transmission sleeve, whereby said power transmission sleeve is shiftable radially relative to said central drive axis so that said outer wall surface of said power transmission sleeve engages said inner hub wall surface and said outer wall surface of said drive sleeve engages said inner wall surface of said power transmission sleeve to engage said hub with said sprocket when said cam lobes depart from positions directly opposite each other relative to said central drive axis, and said power transmission sleeve rotates freely within said cavity in said hub shell when said eccentric surfaces approach diametrical opposition relative to each other, and e. a drag mechanism for restraining rotation of said power transmission sleeve relative to said wheel mounting shaft.

12. A free coaster bicycle wheel driving apparatus according to claim 11 wherein said drag mechanism is comprised of a pair of annular springs that are mounted upon said wheel mounting shaft and biased to exert axial force against said power transmission sleeve from opposite axial directions.

* * * * *